(12) United States Patent
Santelia et al.

(10) Patent No.: US 11,178,111 B2
(45) Date of Patent: *Nov. 16, 2021

(54) LICENSING AUTHORITY CONTROLLED MODIFICATION OF HTTP HEADERS IN A PROXY-BASED SYSTEM

(71) Applicant: International Business Machines Corporation, Armonk, NY (US)

(72) Inventors: Michael Joseph Santelia, Raleigh, NC (US); Mauro Marzorati, Lutz, FL (US); Seda Özses, Vienna (AT); Juraj Nyíri, Ivanka pri Nitre (SK)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 16/202,699

(22) Filed: Nov. 28, 2018

(65) Prior Publication Data

US 2020/0169536 A1 May 28, 2020

(51) Int. Cl.
*H04L 29/06* (2006.01)
*G06F 21/10* (2013.01)
*H04L 29/08* (2006.01)

(52) U.S. Cl.
CPC ........ *H04L 63/0281* (2013.01); *G06F 21/105* (2013.01); *H04L 67/02* (2013.01); *H04L 67/28* (2013.01); *G06F 2221/0773* (2013.01)

(58) Field of Classification Search
CPC ..... H04L 63/0281; H04L 67/02; H04L 67/28; G06F 21/105; G06F 2221/0773
See application file for complete search history.

(56) References Cited

U.S. PATENT DOCUMENTS

| | | |
|---|---|---|
| 5,708,780 A | 1/1998 | Levergood et al. |
| 7,080,043 B2 | 7/2006 | Chase, Jr. et al. |
| 7,231,661 B1 | 6/2007 | Villavicencio et al. |
| 7,272,639 B1 | 9/2007 | Levergood et al. |
| 7,441,265 B2 | 10/2008 | Staamann et al. |
| 7,500,269 B2 | 3/2009 | Huotari et al. |

(Continued)

OTHER PUBLICATIONS

List of all IBM related dockets, Appendix P, 2020.
(Continued)

*Primary Examiner* — Andrew J Steinle
(74) *Attorney, Agent, or Firm* — Garg Law Firm, PLLC; Rakesh Garg; Anthony Curro

(57) ABSTRACT

A proxy is modified, to form an enhanced proxy, wherein the proxy is configured to inspect a header portion of a Hypertext Transfer Protocol (http) message, the modifying enabling the enhanced proxy to identify, at the enhanced proxy, a set of http header types in the http message received from a system. An external licensing authority (LA) is modified, to form an enhanced LA, wherein the enhanced LA is configured to verify a header parameter corresponding to a header type in the set of header types and return a license information corresponding to the system. The http message is modified by modifying the header portion in the http message according to the header type and a threshold corresponding to the header type, the header type and the threshold being identified in the license information. The modified http message is transmitted.

16 Claims, 14 Drawing Sheets

(56) References Cited

U.S. PATENT DOCUMENTS

| | | | |
|---|---|---|---|
| 7,711,788 B2* | 5/2010 | Lev Ran | H04L 67/02 |
| | | | 709/213 |
| 9,172,753 B1 | 10/2015 | Jiang et al. | |
| 9,589,114 B2 | 3/2017 | Strom et al. | |
| 10,015,143 B1 | 7/2018 | Ferguson et al. | |
| 2001/0037404 A1 | 11/2001 | Hafsteinsson et al. | |
| 2003/0193967 A1 | 10/2003 | Fenton et al. | |
| 2008/0300967 A1 | 12/2008 | Buckley et al. | |
| 2013/0191450 A1* | 7/2013 | Bodenhamer | G06F 16/957 |
| | | | 709/203 |
| 2014/0380499 A1* | 12/2014 | Pruss | G06F 21/62 |
| | | | 726/27 |
| 2015/0271292 A1* | 9/2015 | Tachi | H04L 67/32 |
| | | | 709/203 |
| 2016/0294989 A1* | 10/2016 | Perlmutter | H04L 63/02 |
| 2017/0034201 A1* | 2/2017 | Zaw | H04L 63/102 |
| 2017/0195471 A1* | 7/2017 | Jones | H04L 67/42 |
| 2017/0357783 A1* | 12/2017 | Rahn | G06F 21/105 |
| 2019/0018935 A1* | 1/2019 | V | G06F 9/45558 |
| 2019/0182250 A1* | 6/2019 | Kiester | H04L 63/0428 |

OTHER PUBLICATIONS

Filho et al. teaches "A policy-based framework for interoperable digital content management", 2007.
List of IBM Patents or Applications Treated as Related, 2018.

* cited by examiner

*FIGURE 5A*

```
> GET / HTTP/1.1
> Host: myibm.XYZ.com
502 { > User-Agent: curl/7.51.0
> Accept: */*
>
504 — < HTTP/1.1 200 OK
506 — < content-length: 907
508 — < content-type: text/html
510 — < p3p: CP="NON CUR OTPi OUR NOR UNI"
512 — < server: WebSEAL/9.0.2.0
514 — < x-content-type-options: nosniff
516 — < cache-control: no-cache
518 — < x-xss-protection: 1; mode=block
520 — < content-security-policy: upgrade-insecure-requests;default-src 'self' data: *XYZ.com *.s81c.com; script-src 'unsafe-inline' 'unsafe-eval' 'self' *.XYZ.com;
522 — < referrer-policy: strict-origin-when-cross-origin
524 — < strict-transport-security: max-age=31536000; includeSubDomains
526 — < pragma: no-cache
528 — < set-cookie: MYL-S-SESSION-ID=0_/U2D1izIziiBfGg2/+5IK4S2qPYHTA5PzG0hEx/OYo0rwCadM3c=; Path=/; Secure; HttpOnly
530 — < set-cookie: NSC_JTBNQspyz-WT=ffffffff09ac4c7a45525d5f4f58455e4445a4a42378b;path=/;secure;httponly
532 — < x-transport-license: authority=https://license.example.org/check_license.jsp; ⟵534
licenseID=bfd9b4f683b1b959577352bbdd93c53b8d1585342e6762cabcb298840 4cd41cf;
                                                                          ⟵536
```

540 https://license.example.org/
check_license.jsp?licenseID=bfd9b4f683b1b959577352bbdd93c53b8d1585342e6762cabcb2988404cd41cf+headerlist=content-length,content-type,p3p,server,x-content-type-options,cache-control,x-xss-protection,content-security-policy,referrer-policy,strict-transport-security,pragma,set-cookie

*FIGURE 5C* https://license.example.org/check_license.jsp  552 licenseID=bfd9b4f683b1b959577352bbdd93c53b8d1585342e6762cabcb2988404cd41cf;
headerlist=content-length,content-type,p3p,server,x-content-type-options,cache-control,x-xss protection,content-security-policy,referrer-policy,strict-transport-security,pragma,set-cookie;  554

*FIGURE 5D*

X-Transport-License: status=valid; max-age=600; headerlist=content-length,content-type,p3p,server,x-content-type-options,cache-control,pragma;

*FIGURE 5E*

```
< HTTP/1.1 200 OK
< content-length: 907
< content-type: text/html
< p3p: CP="NON CUR OTPi OUR NOR UNI"
< server: WebSEAL/9.0.2.0
< x-content-type-options: nosniff
< cache-control: no-cache
< pragma: no-cache
< x-transport-license: authority=https://license.example.org/check_license.jsp;
licenseID=bfd9b4f683b1b959577352bbdd93c53b8d1585342e6762cabcb2988404cd41cf;
```

```
license{
  ID: bfd9b4f683b1b959577352bbdd93c53b8d1585342e6762cabcb2988404cd41cf;
  Allowed: *;
  Disallowed: X-XSS-Protection, Content-Security-Policy, Referrer-Policy, Set-Cookie;
  notBefore: YYYY/MM/DD HH:MM:SS;
  notAfter: YYYY/MM/DD HH:MM:SS;
}
```

```
< HTTP/1.1 200 OK
< content-length: 907
< content-type: text/html
< p3p: CP="NON CUR OTPi OUR NOR UNI"
< server: WebSEAL/9.0.2.0
< x-content-type-options: nosniff
< cache-control: no-cache
< x-xss-protection: 1
< content-security-policy: upgrade-insecure-requests;
```

```
< HTTP/1.1 200 OK
< content-length: 907
< content-type: text/html
< p3p: CP="NON CUR OTPi OUR NOR UNI"
< server: WebSEAL/9.0.2.0
< x-content-type-options: nosniff
< cache-control: no-cache
< x-xss-protection: 1 ; mode=block
< content-security-policy: upgrade-insecure-requests; default-src 'self'
```

```
< HTTP/1.1 200 OK
< content-length: 907
< content-type: text/html
< p3p: CP="NON CUR OTPi OUR NOR UNI"
< server: WebSEAL/9.0.2.0
< x-content-type-options: nosniff
< cache-control: no-cache
```
602, 604, 606, 608, 610, 612 — 640

*FIGURE 6D*

```
< HTTP/1.1 200 OK
< content-length: 907
< content-type: text/html
< p3p: CP="NON CUR OTPi OUR NOR UNI"
< server: WebSEAL/9.0.2.0
< x-content-type-options: nosniff
< cache-control: no-cache
< x-xss-protection: 1 ; mode=block
< content-security-policy: upgrade-insecure-requests; default-src 'self'
```
602, 604, 606, 608, 610, 612, 664, 666 — 660

LICENSING AUTHORITY CONTROLLED MODIFICATION OF HTTP HEADERS IN A PROXY-BASED SYSTEM

TECHNICAL FIELD

The present invention relates generally to a method, system, and computer program product for controlling accumulation of undesirable data in HyperText Transfer Protocol (HTTP, http). More particularly, the present invention relates to a method, system, and computer program product for license-based modification of http headers in proxy systems.

BACKGROUND

Unless expressly distinguished where used, a "client system" (hereinafter interchangeably referred to as "client," "client system," or "client application") is a sender of an http request. An http request is a request for data where the request message is constructed in compliance with http specification. An http request can include a section where the needed data is requested, and one or more optional sections called http request headers. An http request header seeks to perform certain operations, transmit optional information, request optional information, or some combination thereof, as desired by the client.

Unless expressly distinguished where used, a "server system" (hereinafter interchangeably referred to as "server," "server system," or "server application") is a sender of an http response. An http response is a response to an http request where the response message is constructed in compliance with http specification. An http response may or may not include the needed data. An http response can include a section where the needed data is included, and one or more optional sections called http response headers. An http response header seeks to perform certain operations, transmit optional information, request optional information, or some combination thereof, as desired by the server.

A proxy system (hereinafter referred to as "proxy") is a data processing system that acts (i) on behalf of a server, as a receiver of an http request from a client or another proxy, (ii) on behalf of a server, as a sender of an http response to a client or another proxy, (iii) on behalf of a client, as a sender of an http request to a server or another proxy, (iv) on behalf of a client, as a receiver of an http response from a server or another proxy, or (v) some combination of (i)-(iv).

A proxy configured in a server-side data processing environment is called a server-side proxy and masquerades as the server. A proxy configured in a client-side data processing environment is called a client-side proxy and masquerades as the client. An intermediate proxy is simply a proxy that is neither in a server-side environment nor in a client-side environment but can be configured to behave as a server-side proxy, a client-side proxy, both as a server-side proxy and a client-side proxy, or as simply a pass-through system for http request-response traffic.

Cookies are data that a server stores on a client for use in the present and subsequent data communications with the client. Typically, a server issues a cookie to the client by including a "set-cookie" http response header in an http response, with instructions for the client to "return" the cookie value back to the server when requesting further transactions with the server for a given amount of time. Correspondingly, when a cookie is set at a client, the client includes the cookie data in a http request header called a "cookie" header in a subsequent transaction with the server.

Many such operations and data communications are presently accomplished by a large set of http request headers and http response headers presently recognized in the http specification. The setting of a cookie causes subsequent action(s) on the part of the client, and possibly—depending on the scope of applicability of a given cookie—also on the part of other servers. The actions of returning a specific cookie to the server may not be desirable in many cases regardless what a server's operator may wish.

SUMMARY

The illustrative embodiments provide a method, system, and computer program product. An embodiment includes a method that modifies a proxy, to form an enhanced proxy, wherein the proxy is configured to inspect a header portion of a Hypertext Transfer Protocol (http) message, the modifying enabling the enhanced proxy to identify, at the enhanced proxy, a set of http header types in the http message received from a system. An embodiment modifies an external licensing authority (LA), to form an enhanced LA, wherein the enhanced LA is configured to verify a header parameter corresponding to a header type in the set of header types and return a license information corresponding to the system. An embodiment modifies the http message by modifying the header portion in the http message according to the header type and a threshold corresponding to the header type, the header type and the threshold being identified in the license information. An embodiment transmits the modified http message.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5A depicts an example http request-response pair that can be modified in accordance with an illustrative embodiment;

FIG. 5B depicts an example license verification request in accordance with an illustrative embodiment;

FIG. 5C depicts another example license verification request in accordance with an illustrative embodiment;

FIG. 5D depicts another example license verification response in accordance with an illustrative embodiment;

FIG. 5E depicts an example modified http response in accordance with an illustrative embodiment;

FIG. 5F depicts an example license configured in a license authority in accordance with an illustrative embodiment;

FIG. 6A depicts an example http response that can be modified in accordance with an illustrative embodiment;

FIG. 6B depicts an example modified http response corresponding to an example http response in accordance with an illustrative embodiment;

FIG. 6C depicts an example http response that can be modified in accordance with an illustrative embodiment;

FIG. 6D depicts an example modified http response corresponding to an example http response in accordance with an illustrative embodiment;

DETAILED DESCRIPTION

Figure 1:
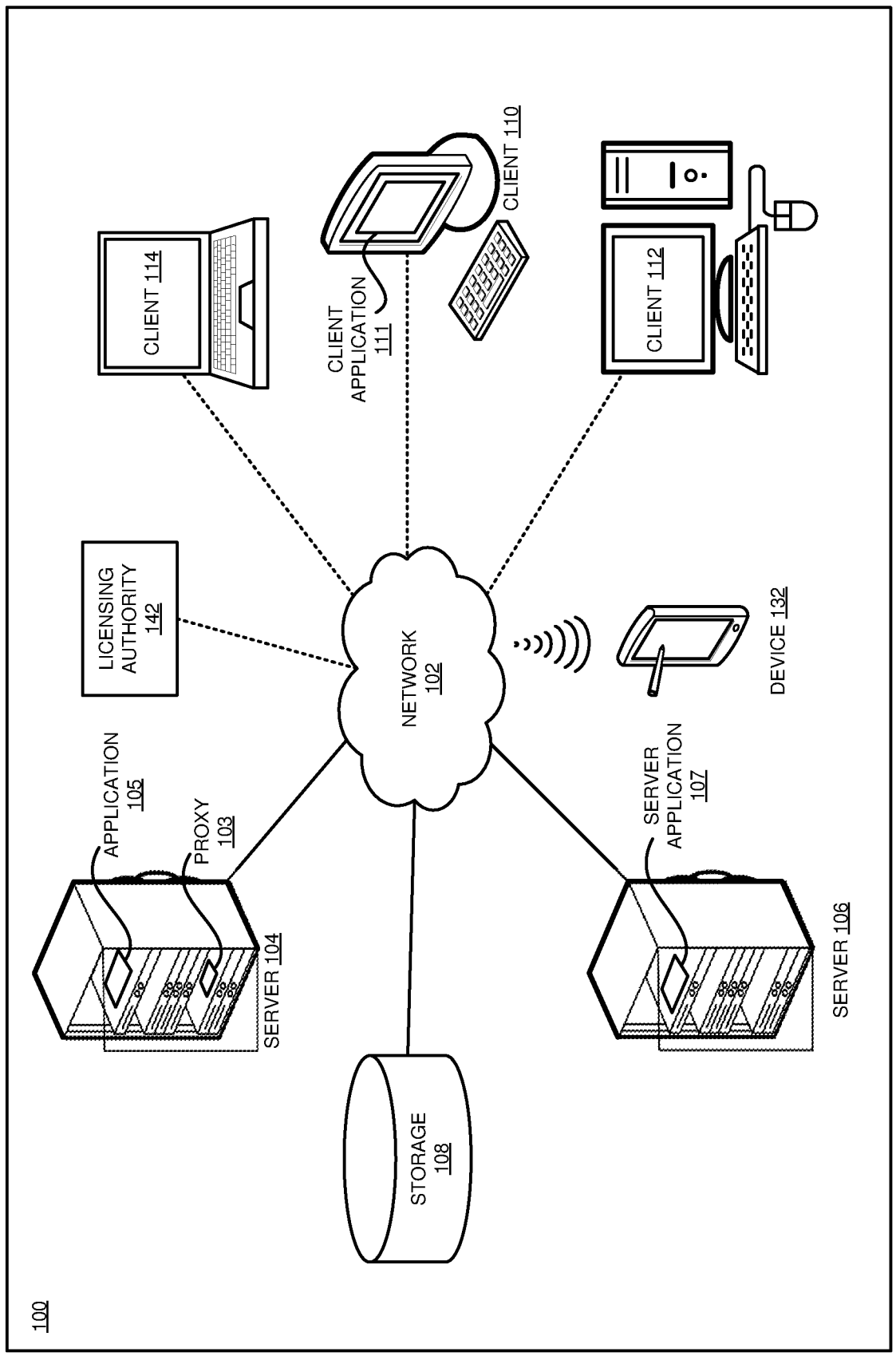
FIG. 1 depicts a block diagram of a network of data processing systems in which illustrative embodiments may be implemented.

The setting of cookies using http headers is used as a non-limiting example use-case to highlight some drawbacks of the present state of the art and to illustrate some operations of the illustrative embodiments that improve the present technological field of endeavor of internet data communications using http.

The illustrative embodiments recognize that applications running on servers can control many aspects of behavior when communicating with client. Among such behavior is the sending and setting of HTTP response headers, for example, Access-Control-Allow-Origin, Cache-Control, Set-Cookie, and others. Sending of http response headers by one server application can also affect other applications running on the same server, in the same domain, or in the same sub-domain as the sender server application.

As a non-limiting example, cookies being set by one server application can also affect other domains or subdomains. For example, domain on sub.example.tld can also set cookies for example.tld as per standard RFC2109, which provides that a Set-Cookie from request-host x.foo.com is also acceptable for Domain=.foo.com.

The illustrative embodiments recognize that multiple server applications running on the same domain also present this problem. One server application performing operations via http response headers can interfere and set cookies for another server application, even overwrite another server application's cookies, causing an unintentional or malicious session highjacking.

Such behavior can cause many problems. Again, using cookies as a non-limiting example, if one server application has to support most browsers, then the cookie size adopted by that server application should not exceed 50 cookies per domain, and 4093 bytes per domain. However, another application in the same server, domain, or sub-domain may be restricted to only a certain type of client. Accordingly, the other application can easily ignore the 50 cookies and 4093 bytes limitation, and store or overwrite a cookie in a non-compliant manner such that the operation of the first application on certain browsers causes errors or other issues. For example, in one example domain, upwards of 12,000 bytes of cookie data has been observed at a given time, with a single cookie taking up to 2000 bytes of space. The illustrative embodiments expect that the Content-Security-Policy header will grow to these levels as well in the coming years.

Consider that there are some http response headers which enable behavior on the client that has consequence beyond the transaction, i.e., the configured behavior is persistent. Such is the Set-Cookie header which causes the client to return data on subsequent transactions to the server that sets the cookie and possibly more servers. The Strict-Transport-Security http response header is another example of persistence in a http header as it instructs the client to potentially require SSL for all hosts in the given domain. The Content-Security-Policy http response header causes the client to change its behavior while processing the HTML/CSS/JS content for potentially more than the server application that sent the header. The related Content-Security-Policy-Report-Only http response header causes the client to make POST to a location in case of a violation, which may be the intended operation for one server application but may be undesirable for another server application that is also affected by the persistent operation, e.g., due to the potential of creating opportunities for information leak, DDoS, and other malicious operations.

Presently, some proxies can be configured with proxy-specific policies. These policies are configured for a specific proxy and are either local within the proxy or resident within the local network in which the proxy operates. There does not exist a per-request or per-response based third-party verification of http headers that the proxy can allow to pass, which is dependent on specific sender and/or receiver of the request/response.

The present state of the technological field of endeavor of internet data communication using http presently does not include a mechanism, other than self-policing by the server applications and proxy-specific policies, to avoid such data communication issues. A need exists for verification of http headers by an entity independent of the header sender and any proxy. A need exists that such verification be performed on a per-request or per-response basis. A need exists that such verification be further specific to the header sender, the intended header recipient, or both. A need exists that the verification be dynamically configurable according to a variety of aspects of the data communication in question. The illustrative embodiments recognize that the presently available tools or solutions do not address these needs/problems or provide adequate solutions for these needs/problems. The illustrative embodiments used to describe the invention generally address and solve the above-described problems and other related problems by license-based modification of http headers in proxy systems.

An embodiment can be implemented as a software application. The application implementing an embodiment, or one or more components thereof, can be configured as a modification of an existing proxy—i.e., a native application in the proxy, as an application executing in a data processing system communicating with an existing proxy over a short-range radio network such as Bluetooth, over a wired or wireline local area network (LAN)—i.e., a local application on the LAN, as an application executing in a data processing system communicating with an existing proxy over a wide area network (WAN)—i.e., a remote application on the WAN, as a separate application that operates in conjunction with an existing proxy in other ways, a standalone application, or some combination thereof.

An embodiment implements a licensing authority (LA). The LA can be instantiated within a local network of a server, a local network of a client, or outside the local networks of the server and the client. Any number of LA instances can be created.

An LA manages license information per sender/originator of an http communication. For example, the LA manages separate licenses for server application 1, server application 2, . . . and server application n. Each server application is a sender or originator of an http response and can potentially attach any number of http response headers in its responses. Similarly, the same LA or a different instance thereof can manage separate licenses for client application 1, client application 2, . . . and client application m. Each client application is a sender or originator of an http request and can potentially attach any number of http request headers in its requests.

A license is a collection of tokens. A token is a single tag-value pair, which is identified by an identifier called a tag and one or more values corresponding to the tag. The tag and the values are each alphanumeric and can be encoded in any suitable manner. Each license has at least one token in which the tag is a suitable manner of indicating that the tag is an identifier associated with a particular originator. For example, the tag may be "LicenseID" and the value may be "bfd9b4f683b1b959577352bbdd93c53b8d1585342e6762c abcb2988404cd41cf" where the value is uniquely associated with a particular originator, e.g., server application x (which operates in server data processing system y, in sub-domain a.b.c).

Additional tokens in a license can include one or more tags indicating allowance of certain header types and having as value one or more allowed http header types, one or more tags indicating disallowance of certain header types and having as value one or more disallowed http header types, one or more tags indicating a period of validity of allowance/disallowance of a specific respective allowed/disallowed header type or all allowed/disallowed header types, or some combination of these and other tokens.

Additional tokens in a license can include one or more tags indicating a parameter associated with a specific header type. Such a parameter can specify a particular setting or a minimum or maximum numeric setting associated with a specific header type. For example, the http header type x-xss-protection specifies whether cross-site scripting (XSS) filtering should be on (1) or off (0) and if on, may include an additional mode specification. An example license parameter for the x-xss-protection http header type could specify that XSS protection must be set to 1, or that XSS protection must be set to 1 and additionally specify a mode setting. As another example, the http header type Retry-After instructs client to try again later, if a resource is currently unavailable. Retry-After includes a time specification, which can be a specified period of time (in seconds) or a date. Thus, an example license parameter for the Retry-After header type might specify a minimum time specification to be enforced, modifying any Retry-After header that is lower than the minimum, or a maximum time specification to be enforced, modifying any Retry-After header that is higher than the maximum. An example license parameter for the Retry-After header type might also specify a particular time specification, modifying any Retry-After header to the specified time setting.

These examples of tokens and tag-values are not intended to be limiting. From this disclosure, those of ordinary skill in the art will be able to conceive many other tokens and tag-values and the same are contemplated within the scope of the illustrative embodiments.

A server application is configured for http communications with one or more client applications. At initiation of a server application, or at some point during the operation of the server application, the server application gets/requests/initiates a license at an LA instance. For clarity, assume that the LA instance executes outside the control of the local network of the server application and the client application. The LA instance is independent of any proxy, can be queried by any proxy in a manner described herein.

As a consequence of initiating a license at the LA, the server application becomes associated with a unique value of a license identifier token in the license. The LA populates the license with allowance tokens, disallowance tokens, validity period tokens, or some combination thereof. This populating is independent of any proxies, i.e., is not proxy-specific. The license is not locally resident in the proxy, is not managed by the proxy, and is not a proxy policy. In some cases, a proxy can cache a license for improving license verification efficiency, but the license remains non-proxy-specific. Furthermore, only the temporarily cached copy of the license, not the license itself, is managed by the proxy in such cases, such as to determine when the cached copy should be discarded.

The populating of the license is also dynamic, i.e., can be different according to different conditions. For example, the dynamic populating includes but is not limited to populating the license differently for the same request or client at different times, differently for the same response or server at different times, differently for the same header in different requests from the same client, differently for the same header in different responses from the same server, an allowance or disallowance having different validity for the same header at different times from the same client, an allowance or disallowance having different validity for the same header at different times from the same server, and/or differently for the same header from different clients or servers.

An embodiment enables a proxy to perform certain operations described herein. For example, when a server application sends a response, the embodiment causes the proxy to examine the response and extract the server's license identifier and the set of http response headers included in the response, and optionally the response type if applicable in the license implementation.

The embodiment causes the proxy to construct a license verification message for the LA. The license verification message includes the server's license identifier and the set of http response headers included in the response, and optionally the response type if applicable in the license implementation. The embodiment causes the proxy to transmit the license verification message to the LA.

Depending on the contents of the license corresponding to the server's license identifier, the LA sends a license verification response to the proxy. The embodiment causes the proxy to modify the server application's response according to the license verification response. For example, if the license verification response indicates that a certain http response header is disallowed, the embodiment causes the proxy to suppress (not pass through) that http response header from the server's response. The embodiment causes the proxy to pass through that http response header in the server's response which is either not indicated in the disallowed values or is indicated as an allowed value.

The license verification response can specify that a certain http response header must have a particular setting or a minimum or maximum numeric setting. If an embodiment determines that the http response header does not currently have a parameter that exceeds the threshold, the embodiment causes the proxy to modify that http response header in the server's response according to the license verification response. The embodiment causes the proxy to pass through that http response header in the server's response, in the modified form. If, instead, am embodiment determines that the http response header is not currently included in the server's response, the embodiment causes the proxy to add that http response header in the server's response according to the license verification response. The embodiment causes the proxy to pass through the added http response header in the server's response.

If license caching is implemented in the proxy, a current copy of the server's license may be available in the cache of the proxy. In such a case, an embodiment allows the proxy to omit configuring and transmitting the license verification message to the LA and instead direct the message at the local cached copy of the license corresponding to the server's license identifier. The embodiment causes the proxy to perform an evaluation of the allowed and disallowed tokens in the license, comparing the allowed and disallowed tokens in the license with headers in the message being processed. The embodiment causes the proxy to suppress those headers that are found in the disallowed token values in a manner similar to the suppression according to the license verification response from the LA. The embodiment also causes the proxy to modify headers as specified in the local cached copy of the license in a manner similar to the modification according to the license verification response from the LA. The embodiment also causes the proxy to add headers as specified in the local cached copy of the license in a manner similar to the addition according to the license verification response from the LA.

Only as a non-limiting example, the above operations are described with respect to a server application, http response message, http response headers, and a server-side proxy. An embodiment can similarly enable a client-side proxy to analyze an http request from a client application and suppress, modify, and add certain http request headers. The suppression, modification, and addition in the http request can also result from a license verification response from an LA or a cached local copy of a client's license at the client-side proxy.

According to one embodiment, multiple proxies can be enabled for http header suppression in a similar manner. For example, in one embodiment, a server-side proxy is enabled to suppress disallowed http response headers and a client-side proxy is enabled to suppress disallowed http request headers. An intermediate proxy—i.e., a proxy not on the server-side or the client-side—can also be enabled to similarly selectively suppress certain http headers in either the request or the response or both. Any number of proxies, in any combination of any number of server-side/client-side/intermediate proxies, can be similarly enabled using an embodiment to selectively suppress different http headers at different points along the communication pathway of an http communication between a client and a server. As well, any number of proxies, in any combination of any number of server-side/client-side/intermediate proxies, can be similarly enabled using an embodiment to selectively modify different http headers at different points along the communication pathway of an http communication between a client and a server. Further, any number of proxies, in any combination of any number of server-side/client-side/intermediate proxies, can be similarly enabled using an embodiment to selectively add different http headers at different points along the communication pathway of an http communication between a client and a server.

The manner of license-based modification of http headers in proxy systems described herein is unavailable in the presently available methods in the technological field of endeavor pertaining to internet data communications using http. A method of an embodiment described herein, when implemented to execute on a device or data processing system, comprises substantial advancement of the functionality of that device or data processing system in preventing undesirable persistence and use of data or operations on either side of the http communication.

The illustrative embodiments are described with respect to certain types of locations of embodiments, proxies, messages, headers, licenses, tokens, tag-values, suppression or inclusion, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
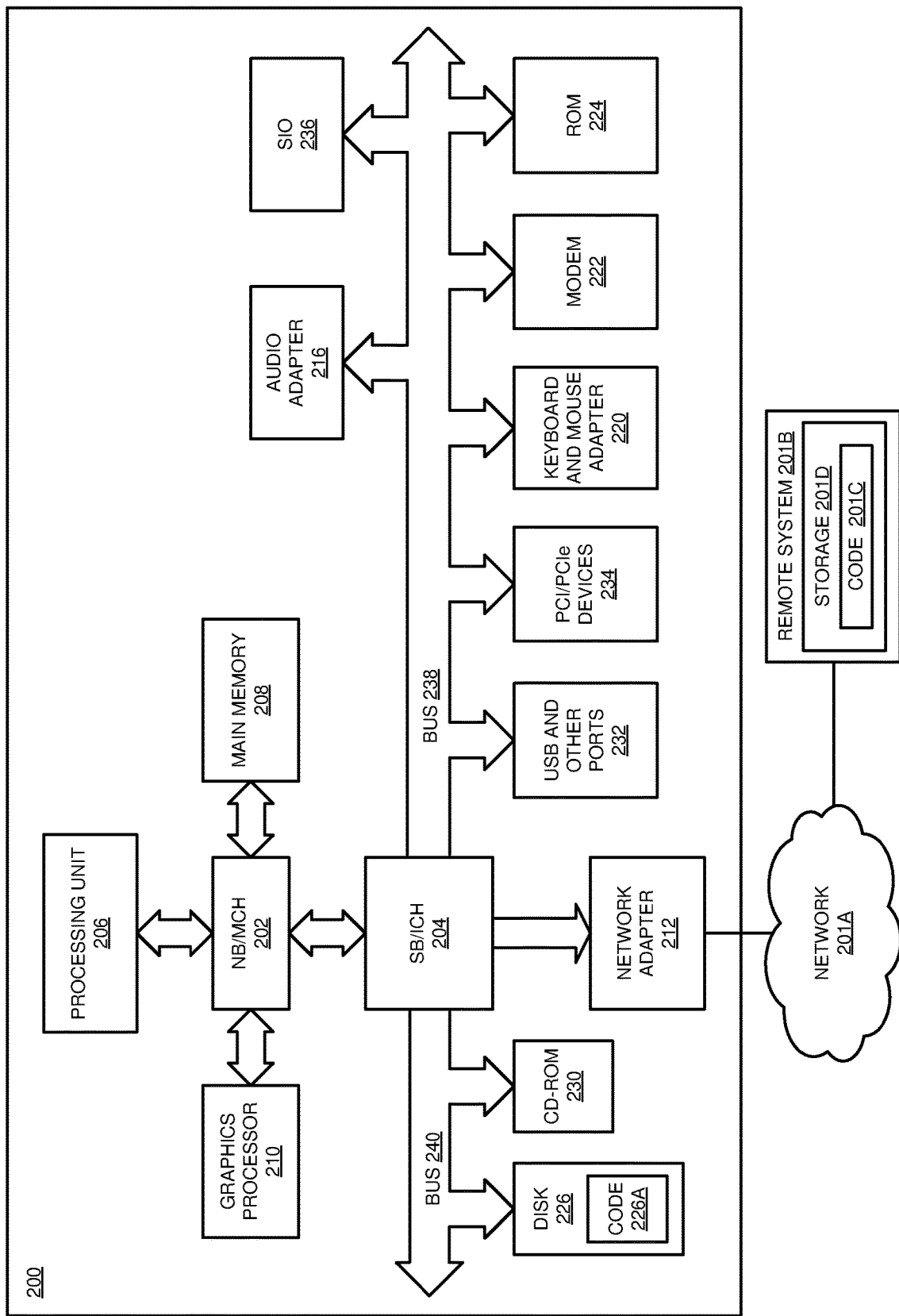
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment to enable proxy 103 with certain operations relative to http messaging between server application 107 and client application 111 as described herein. Licensing authority 142 is not located in network 102 in the manner of server system 104 or server system 107 (which are connected to network 102 by solid lines) but is reachable from network 102 (as represented by the dashed line connection with network 102) for license verification requests and responses, or optionally for caching of licenses at proxy 103, as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
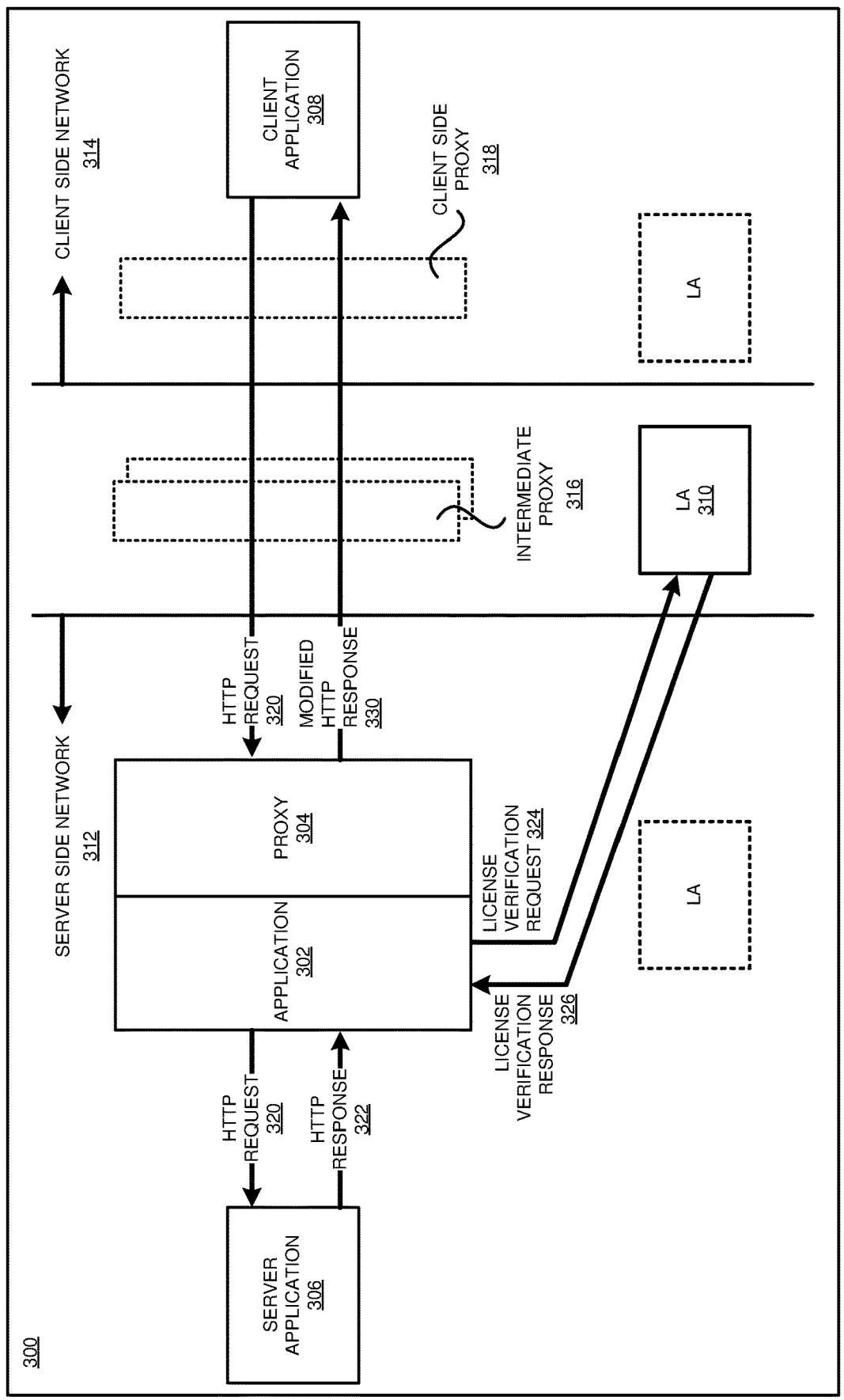
FIG. 3 depicts a block diagram of an example configuration for license-based modification of http headers in proxy systems in accordance with an illustrative embodiment.

With reference to FIG. 3, this figure depicts a block diagram of an example configuration for license-based modification of http headers in proxy systems in accordance with an illustrative embodiment. In non-limiting example configuration 300, application 302 is an example of application 105, proxy 304 is an example of proxy 103, server application 306 is an example of server application 107, and client application 308 is an example of client application 111 in FIG. 1.

LA 310 is an example of LA 142 in FIG. 1. LA 310 is an instance of an LA executing outside server-side network 312 and the client-side network 314, such as somewhere over the internet. More than one instances of LA 310 are possible on the internet. Instances of LA are also possible within server-side network 312 and/or client-side network 314 as depicted by dotted LA instances therein.

Additional proxies are possible and contemplated in the illustrative embodiments, such as any number of intermediate proxies 316, one or more client-side proxy 318, additional server-side proxies, or some combination thereof.

Only proxy 304 is used in configuration 300 for the clarity of the description and not to imply any limitation to the number or placement of proxies within the scope of the illustrative embodiments.

Client application 308 sends http request 320. Proxy 304 is normally configured to cache some data that can be used to respond to some http requests without forwarding the http request to server application 306. Assume, only for the clarity of the description, that http request 320 cannot be responded to by proxy 304 based on the cached data. Accordingly, proxy 304 forwards http request 320 to server application 305.

Server application 306 prepares http response 322. Http response 322 includes a license identifier associated with server application 306, assuming that server application 306 has already initiated a license with LA 310. Http response 322 also includes a set of http response headers.

Application 302 operates in conjunction with proxy 304 and enables proxy 304 to perform certain operations described herein. Proxy 304 enabled by application 302 (referred to interchangeably hereinafter as "enhanced proxy") receives http response 322 and extracts the license identifier. Enhanced proxy 302-304 further determines the header types associated with the http response headers in response 322. Enhanced proxy 302-304 constructs and transmits license verification request 324 to LA 310. LA 310 uses the license associated with the license identifier of server application 306 to determine the allow/disallow permissions indicated in the license. LA 310 optionally also determines the validity periods associated with (i) one or more subsets of one or more individual header types identified in the validation request, (ii) the entire set of header types identified in the validation request, (iii) the license as a whole. Depending on the permissions found in the license and the validity of header types and/or the license, LA 310 sends license verification response 326 to enhanced proxy 302-304.

Using license verification response 326, enhanced proxy 302-304 modifies http response 322 by suppressing those headers from response 322 that are either included in a disallowed list of header types in license verification response 326 or are not included in an allowed list of header types in license verification response 326, resulting in modified http response 330. Alternatively, enhanced proxy 302-304 modifies http response 322 by modifying those headers from response 322 according to license verification response 326, resulting in modified http response 330. Alternatively, enhanced proxy 302-304 modifies http response 322 by adding headers to response 322 according to license verification response 326, resulting in modified http response 330. Enhanced proxy 302-304 transmits modified http response 330 on a data path towards client application 308.

Figure 4:
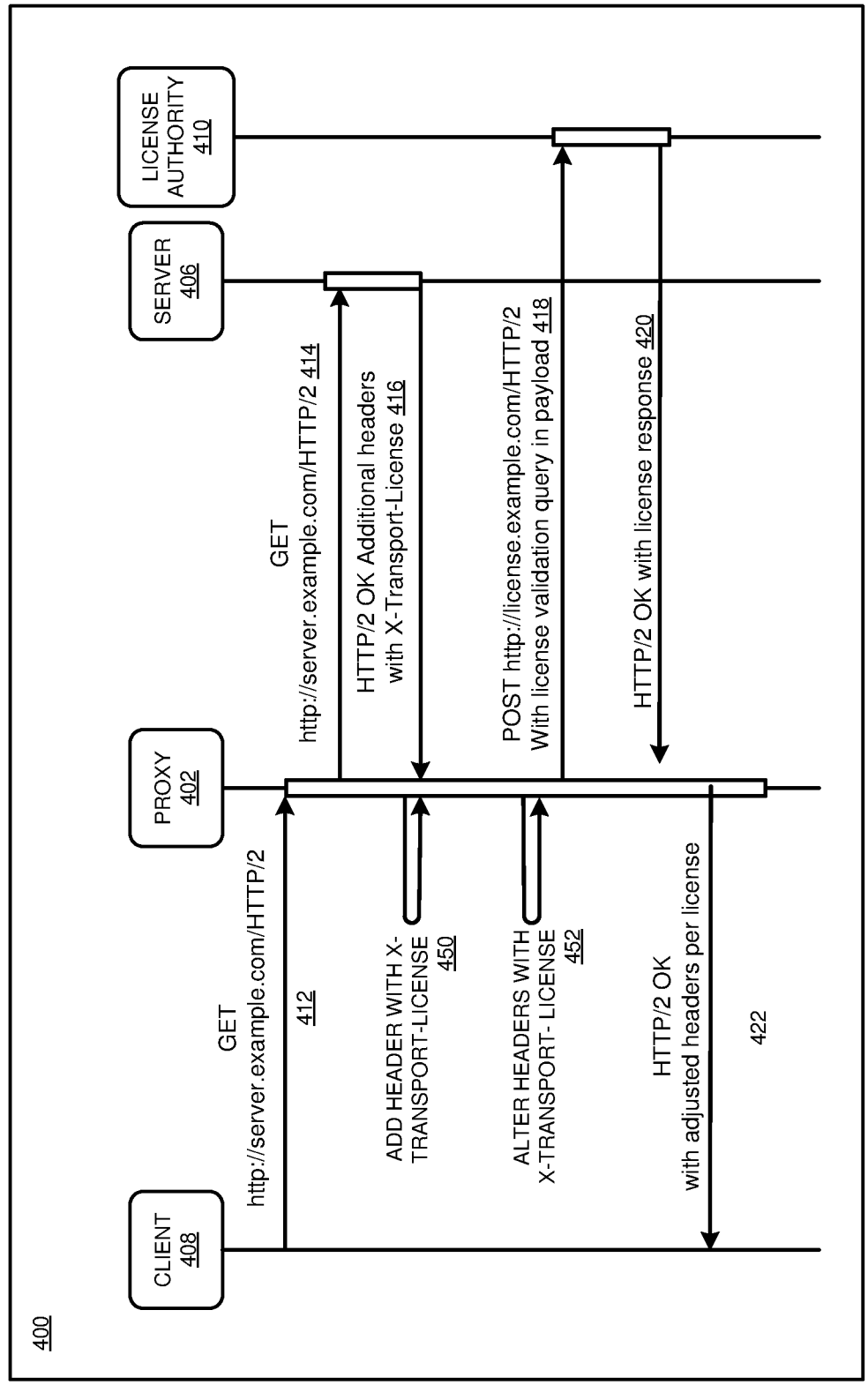
FIG. 4 depicts an example timing diagram representing an example license-based modification of http headers in proxy systems operation in accordance with an illustrative embodiment.

With reference to FIG. 4, this figure depicts an example timing diagram representing an example license-based modification of http headers in proxy systems operation in accordance with an illustrative embodiment. Diagram 400 illustrates a sequence of operations using a specific example http request-response pair. Proxy 402 is an example of enhanced-proxy 302-304 in FIG. 3. Server 406 is an example of server application 306, client 408 is an example of client application 308, and LA 410 is an example of LA 310 in FIG. 3.

In step 412, client 408 sends an example "GET" http request to server 406. Proxy 402 receives the http request and forwards to server 406 in step 414. In step 416, server 406 sends client 408 an example http response including http response headers and server's license identifier "X-Transport-License".

Proxy 402 receives the http response and determines the license identifier and http response header types carried in the http response. In step 418, proxy 402 sends an example "POST" license verification request to LA 410. The POST request includes the license identifier and the http response header types as a query in the payload section of the request.

In step 420, LA 410 sends a license verification response to proxy 402. The license verification response includes the response to the license verification query from step 418. In step 450, if the license verification response indicates that an http response header should be added according to the license verification response, a modified http response is created including the added http response header. In step 452, if the license verification response indicates that an http response header should be modified according to the license verification response, a modified http response is further modified with a correspondingly modified http response header. As well, the modified http response may exclude all such http response headers that have been disallowed according to the response in step 420.In step 422, proxy 402 transmits the modified http response to client 408.

With reference to FIG. 5A, this figure depicts an example http request-response pair that can be modified in accordance with an illustrative embodiment. Http request-response pair 500 includes http request 502 and http response 504. Http request 502 may be an example of the request in step 412 and http response 504 may be an example of the response in step 416 of FIG. 4.

http response 504 includes http response headers 506 (content-length), 508 (content-type), 510 (p3p), 512 (server), 514 (x-content-type-options), 516 (cache-control), 518 (x-xss-protection), 520 (content-security-policy), 522 (referrer-policy), 524 (strict-transport-security), 526 (pragma), 528 (set-cookie), and 530 (set-cookie). Header 532 provides a reference to a license authority to use (https://license.example.org/check_license.jsp), and license identifier (licenseID) 534 has the value of the license identifier to use for the server application that sent http response 504.

With reference to FIG. 5B, this figure depicts an example license verification request in accordance with an illustrative embodiment. Request 540 is an example http request constructed as an http GET transaction with the LA, and as such specifies the licenseID and the set of http response header types as a query in the request.

With reference to FIG. 5C, this figure depicts another example license verification request in accordance with an illustrative embodiment. Request 550 is an example http request constructed for use in an http POST method with the LA. As such request 550 includes two parts—part 552 which is the request, and part 554 which is the payload and includes the query comprising the licenseID and the set of http response header types.

With reference to FIG. 5D, this figure depicts another example license verification response in accordance with an illustrative embodiment. Response 560 is an example assertion returned from the LA in response to the query of either FIG. 5B or 5C. Response 560 provides that the specified subset of header types is valid (allowed). In the depicted example, the subset of header types includes content-length (506 in response 504 in FIG. 5A), content-type (508 in response 504 in FIG. 5A), p3p (510 in response 504 in FIG. 5A), server (512 in response 504 in FIG. 5A), x-contenttype-options (514 in response 504 in FIG. 5A), cache-control (516 in response 504 in FIG. 5A), and pragma (526 in response 504 in FIG. 5A).

Response 560 further provides that the valid header types are valid for a maximum period of 600 seconds from the time of response 560. This specifying of the validity time period allows the enhanced proxy to cache the assertion of response 560 so that for subsequent license verifications of additional http responses from the same server application, the enhanced proxy does not have to request license verifications from the LA and can perform such validation using the cached assertion. The cached assertion is used as the cached license for licenseID 536 at the enhanced proxy.

With reference to FIG. 5E, this figure depicts an example modified http response in accordance with an illustrative embodiment. The specifying of the valid header types in response 560 of FIG. 5D indicates that the header types that are excluded from the subset are invalid (disallowed) and should be suppressed. Thus, for response 504 in FIG. 5A, http response headers 518 (x-xss-protection), 520 (content-security-policy), 522 (referrer-policy), 524 (strict-transport-security), 528 (set-cookie), and 530 (set-cookie) will be suppressed from response 504, resulting in modified http response 570. Modified http response 570 includes only those http headers indicated as valid in response 560 of FIG. 5D. Header 532 may or may not be suppressed depending upon the implementation. In the depicted non-limiting example, header 532 is not subject to suppression and is passed through by the enhanced proxy.

With reference to FIG. 5F, this figure depicts an example license configured in a license authority in accordance with an illustrative embodiment. License 580 includes token 582, which has a tag of "licenseID" and a value corresponding to the server application that sends http response 504, i.e., the value corresponding to tag 536 in response 504 in FIG. 5A.

Token 584 is an allowed list of header types. According to the depicted example, all http header types are allowed except those that are disallowed according to token 586. Token 586 includes a list of disallowed header types. Tokens 588 and 590 together specify a time window during which license 580 is valid and usable.

With reference to FIG. 6A, this figure depicts an example http response 600 that can be modified in accordance with an illustrative embodiment. Http response 600 includes http response headers 602 (content-length), 604 (content-type), 606 (p3p), 608 (server), 610 (x-content-type-options), 612 (cache-control), 614 (x-xss-protection), and 616 (content-security-policy). A header providing a reference to a license authority to use and including the value of the license identifier to use for the server application that sent http response 600 is not shown, but is similar to header 532 in FIG. 5A.

With reference to FIG. 6B, this figure depicts an example modified http response 620 corresponding to example http response 600 in FIG. 6A in accordance with an illustrative embodiment. Http response headers 602 (content-length), 604 (content-type), 606 (p3p), 608 (server), 610 (x-content-type-options), and 612 (cache-control) are the same as http response headers 602 (content-length), 604 (content-type), 606 (p3p), 608 (server), 610 (x-content-type-options), and 612 (cache-control) in FIG. 6A. Here, the license identified by the license identifier specifies that a certain level of XSS protection and content security policy (CSP) is required, and headers 614 and 616 do not meet the required minimum level of protection specified. Thus, modified http response 620 includes altered header 624, now including a "mode=block" specification, and altered header 626, now including a "default-src 'self'" specification, to meet the specified requirements.

With reference to FIG. 6C, this figure depicts an example http response 640 that can be modified in accordance with an illustrative embodiment. Http response headers 602 (content-length), 604 (content-type), 606 (p3p), 608 (server), 610 (x-content-type-options), and 612 (cache-control) are the same as http response headers 602 (content-length), 604 (content-type), 606 (p3p), 608 (server), 610 (x-content-type-options), and 612 (cache-control) in FIG. 6A. A header providing a reference to a license authority to use and including the value of the license identifier to use for the server application that sent http response 640 is not shown, but is similar to header 532 in FIG. 5A.

With reference to FIG. 6D, this figure depicts an example modified http response 660 corresponding to example http response 640 in FIG. 6A in accordance with an illustrative embodiment. Http response headers 602 (content-length), 604 (content-type), 606 (p3p), 608 (server), 610 (x-content-type-options), and 612 (cache-control) are the same as http response headers 602 (content-length), 604 (content-type), 606 (p3p), 608 (server), 610 (x-content-type-options), and 612 (cache-control) in FIG. 6C. Here, the license identified by the license identifier specifies that a certain level of XSS protection and content security policy (CSP) is required. However, http response 640 does not include any x-xss-protection or content-security-policy headers, and as a result does not meet the required minimum level of protection specified. Thus, modified http response 660 includes added header 664 (x-xss-protection) and header 616 (content-security-policy).

FIGS. 7A, 7B, 7C, 7D, and 7E together depict a process for license-based modification of http headers in proxy systems in accordance with an illustrative embodiment. Five swim lanes are collectively depicted in FIGS. 7A-7E, namely one for each of (i) operations of a client application, (ii) operations of a server application, (iii) operations occurring at an enhanced proxy acting as a client, (iv) operations occurring at the enhanced proxy, (v) operations occurring at the enhanced proxy acting as a server, and (vi) operations occurring at the LA. Furthermore, each swim lane has three phases—a request phase, a licensing phase, and a response phase. Not each swim lane need have an operation in each phase.

Figure 7A:
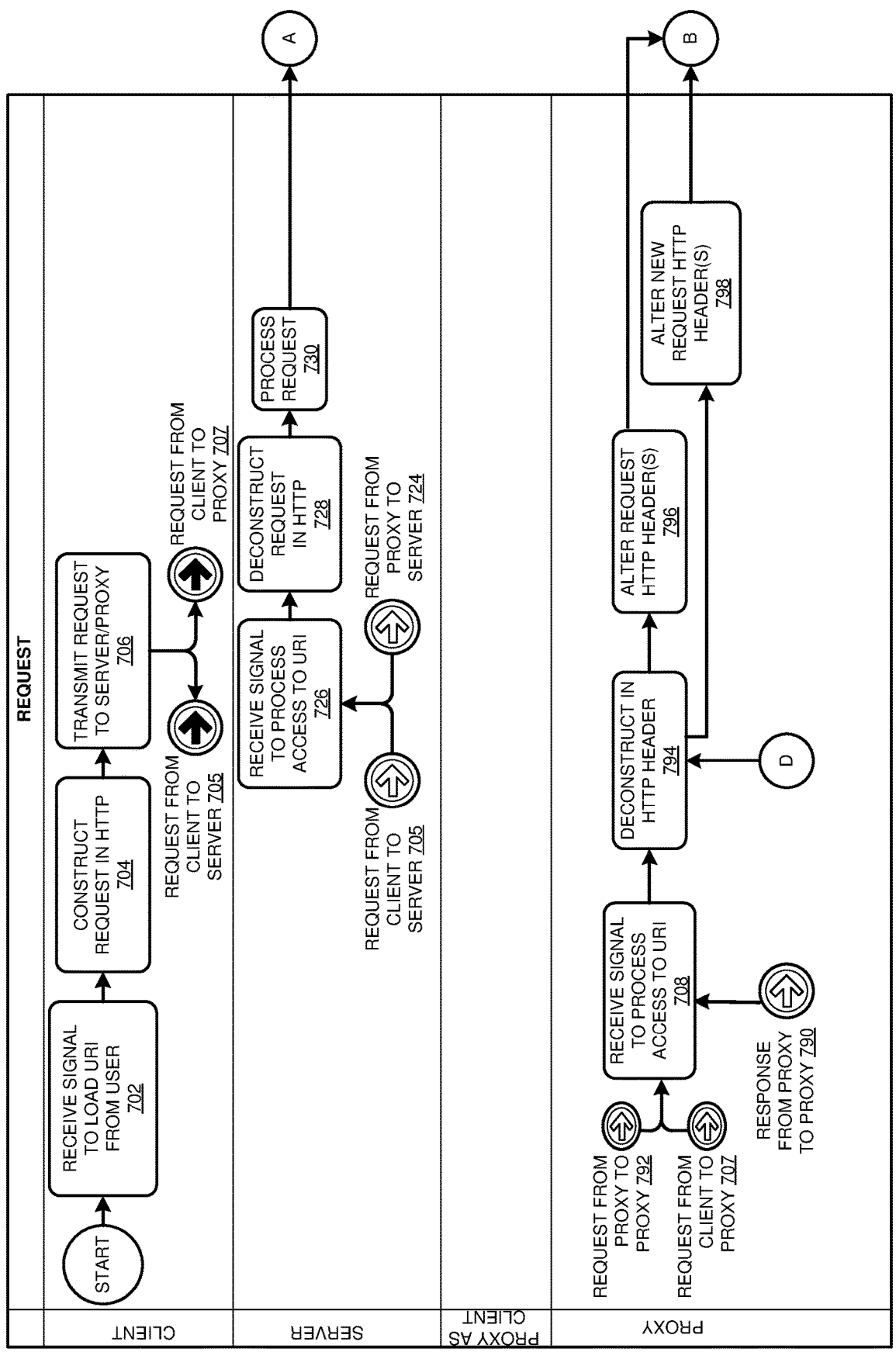
FIG. 7A depicts an example process in the request phase of all swim lanes in accordance with an illustrative embodiment.
Figure 7B:
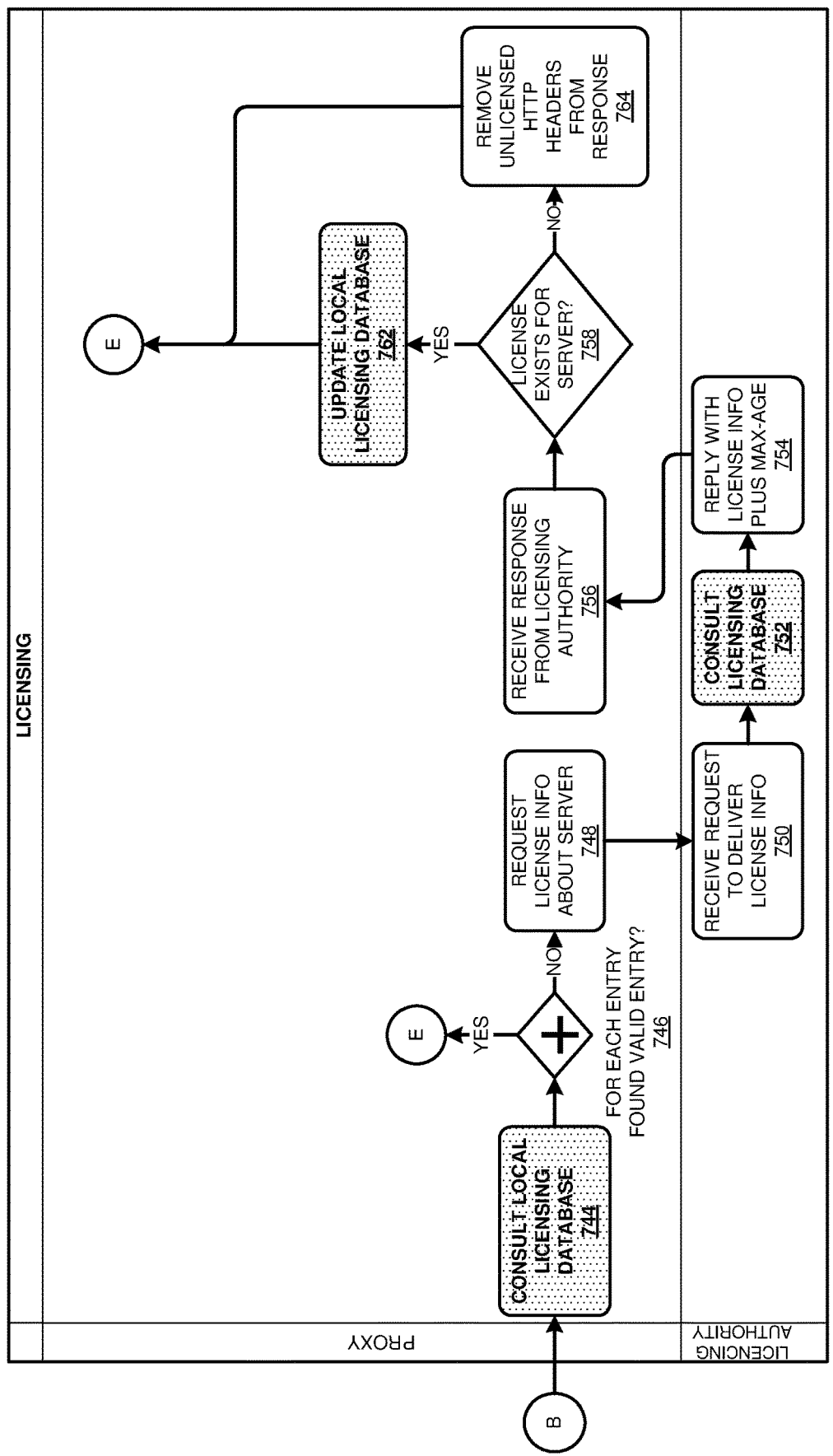
FIG. 7B depicts an example process in the licensing phase of all swim lanes in accordance with an illustrative embodiment.
Figure 7C:
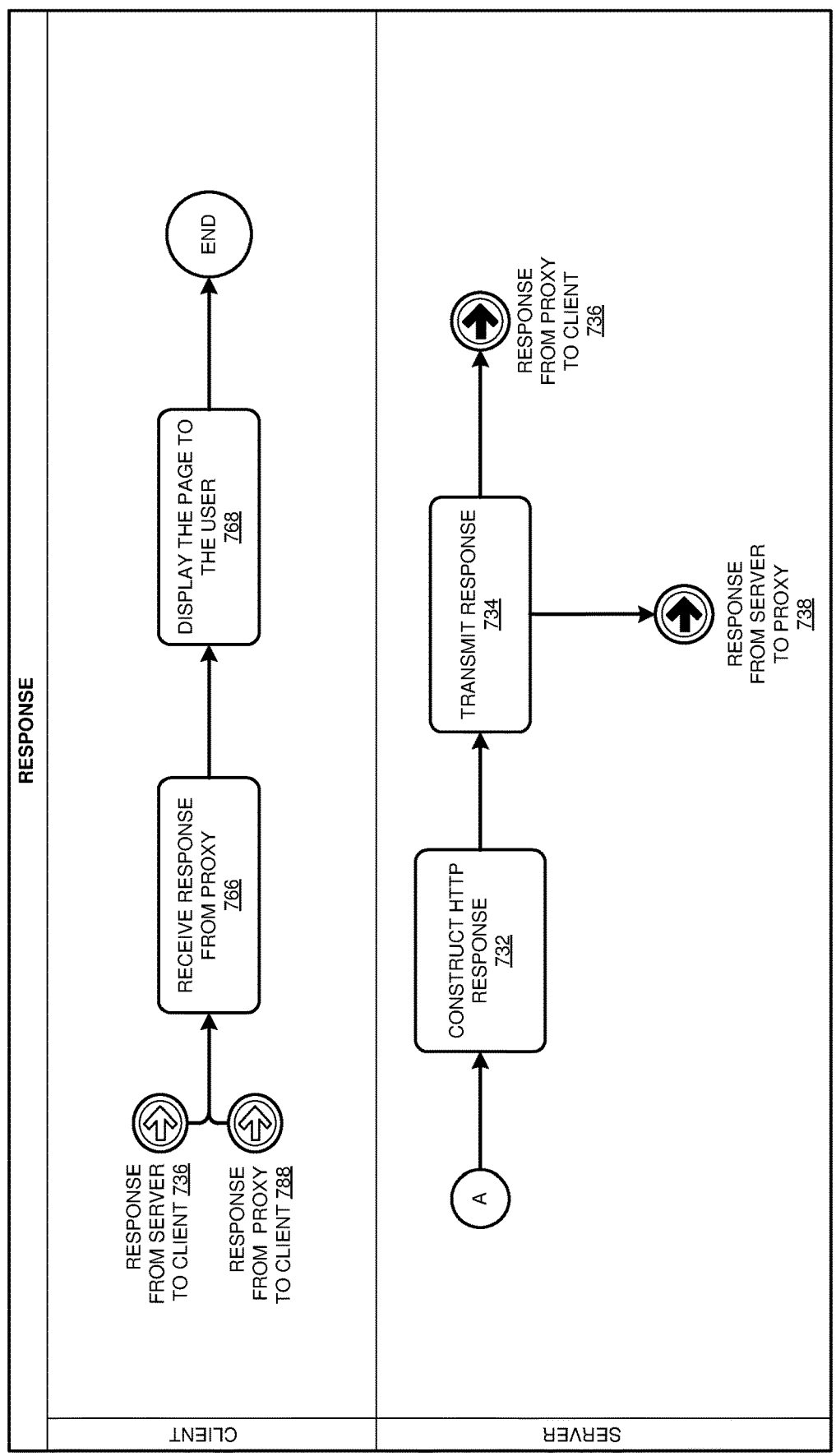
FIG. 7C depicts an example process in the response phase of the client and server swim lanes in accordance with an illustrative embodiment.
Figure 7D:
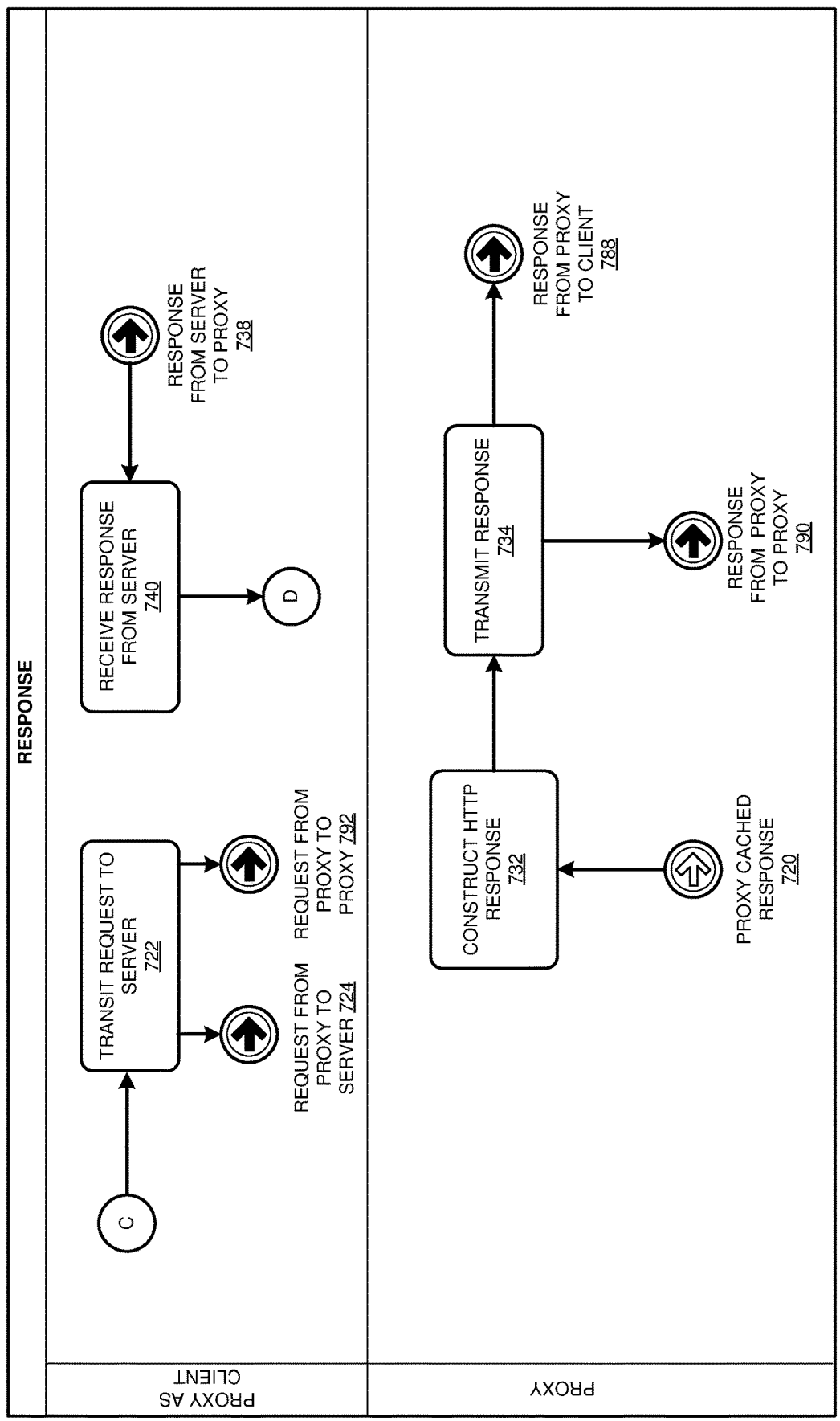
FIG. 7D depicts an example process in the response phase of the proxy as client and proxy swim lanes in accordance with an illustrative embodiment.
Figure 7E:
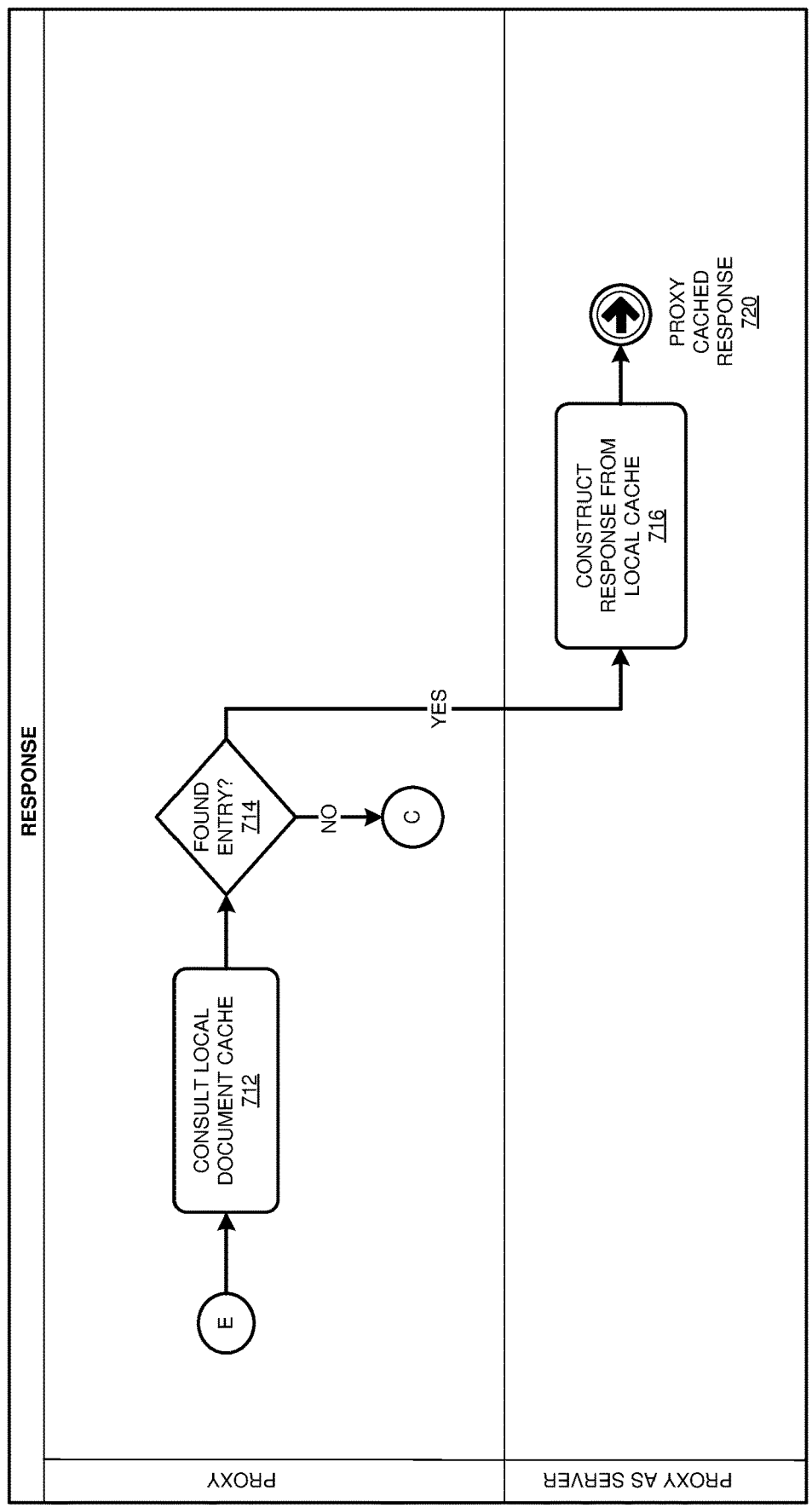
FIG. 7E depicts an example process in the response phase of the proxy and proxy as server swim lanes in accordance with an illustrative embodiment.

With reference to FIG. 7A, this figure depicts an example process in the request phase of all swim lanes in accordance with an illustrative embodiment. With reference to FIG. 7B, this figure depicts an example process in the licensing phase of all swim lanes in accordance with an illustrative embodiment. With reference to FIG. 7C, this figure depicts an example process in the response phase of the client and server swim lanes in accordance with an illustrative embodiment. With reference to FIG. 7D, this figure depicts an example process in the response phase of the proxy as client and proxy swim lanes in accordance with an illustrative embodiment. With reference to FIG. 7E, this figure depicts an example process in the response phase of the proxy and proxy as server swim lanes in accordance with an illustrative embodiment. The client application is an example of client 408 in FIG. 4, the server application is an example of server 406 in FIG. 4, the proxy is an example of enhanced proxy 402 in FIG. 4, and the LA is an example of LA 410 in FIG. 4.

The process begins in the request phase, when the client receives a signal to prepare an http request, such as when a uniform resource identifier (URI) is requested by a user (block 702). The client constructs the http request (block 704). The client transmits the http request (block 706) to a server (block 705), or to a proxy for the server (block 707).

Suppose that block 707 operates and the proxy receives the http request from the client. The proxy may also receive a request from itself (block 792) or a response from itself (block 790). Regardless, the proxy receives the http request (block 708) and deconstructs the request according to the http specification (block 794). If necessary, the proxy alters one or more headers in the request (block 796) and adds one or more headers in the request (block 798). In any case, the process then exits the request phase via exit point B to enter the licensing phase of FIG. 7B via a corresponding entry point B.

If, instead of block 707, block 705 operates, the server receives the http request directly from the client. The server may also receive a request from the proxy, via block 724. Regardless, the server receives the http request (block 726). The server deconstructs the request according to the http specification (block 728). The server processes the request (block 730), and the process exits the request phase of FIG. 7A via exit point A to enter a corresponding entry point A in the response phase of FIG. 7C.

In the response phase, the server constructs an http response, including http response headers (block 732). The server transmits the http response (block 734) to the client via block 736 and to the proxy (block 738). In FIG. 7D, the proxy receives the response from the server (block 740) via block 738, and, via exit point D and corresponding entry point D in FIG. 7A, returns to block 794.

Returning to the licensing phase, in FIG. 7B, in the proxy swim lane, the proxy consults a local license cache at the proxy (block 744). The proxy determines whether a license copy for the server exists in the local cache at all, and even if the copy exists, does the copy include permissions for all the header types present in the http response prepared by the server (block 746). If the answer at block 746 is affirmative ("Yes" path of block 746), the proxy proceeds via exit E to enter the response phase at entry E.

If the answer at block 746 is negative ("No" path of block 746), the proxy sends a license verification request to the LA (block 748). The LA receives the license verification request from the proxy (block 750). The LA consults the license database to find the server's license (block 752). The LA returns the license information along with the validity (maximum age) of the license (block 754). The proxy receives the license information from the LA (block 756). The proxy determines whether the license information indicates that the license exists for the server (block 758). If no license was active or found for the server ("No" path of block 758), the proxy performs a configured "no license" action (block 760). The "no license" actions can include but are not limited to suppressing all or certain optional http response headers from the http response of the server, rejecting the http response of the server all together, or forming a default http response on behalf of the server.

If a license was active or found for the server ("Yes" path of block 758), the proxy optionally updates the local license cache with the copy of the license information (block 762). The proxy modifies the http response of the server by suppressing the disallowed headers according to the license information (block 764). After block 760 or 764, the process exits the licensing phase at exit E to enter the response phase at entry E.

In the response phase of FIG. 7E, at entry E, the proxy looks up a local data cache (block 712) to determine whether the data requested in the http request is available locally (block 714). If the data is found in the cache ("Yes" path of block 714), the proxy constructs the http response from the local cache (block 716) and outputs the proxy cached response (block 720). In FIG. 7D, still the response phase, the proxy continues to output the proxy cached response (block 720) by constructing an http response, including http response headers (block 732) and transmitting the http response (block 734) to the client via block 788 and to the proxy (block 790). Returning to FIG. 7E, If the data is not found or is stale in the proxy's cache ("No" path of block 714), the proxy exits at exit point C and returns to FIG. 7D at entry point C, where the proxy decides to send the http request (block 722). The proxy forwards the request from the proxy to the server (block 724). The proxy may also forward the request to itself (block 792).

Returning to FIG. 7C, the client receives the modified http response (block 766) via either block 736 or block 788. The client presents the result of the URI request to the user (block 768). The process ends thereafter.

Thus, a computer implemented method, system or apparatus, and computer program product are provided in the illustrative embodiments for license-based modification of http headers in proxy systems and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   modifying a proxy, to form an enhanced proxy, wherein the proxy is configured to inspect a header portion of a Hypertext Transfer Protocol (http) message, the modifying enabling the enhanced proxy to identify, at the enhanced proxy, a set of http header types in the http message received from a system;
   modifying an external licensing authority (LA), to form an enhanced LA, wherein the enhanced LA is configured to verify a header parameter corresponding to a header type in the set of http header types and return a license information corresponding to the system, the license information specifying a first header type, a validity period specific to the first header type, a numeric value corresponding to the first header type, and a second header parameter corresponding to the first header type, the second header parameter required to be set in a header of the first header type when a first header parameter of the header of the first header type in the http message is set to the numeric value;
   modifying, responsive to determining that, within the header portion of the http message, the first header type is present, the first header parameter is set to the numeric value and the second header parameter is not set, and the first header type is valid according to the validity period, the http message by adding the second header parameter to the header portion of the http message; and transmitting the modified http message.

2. The method of claim 1, further comprising:

receiving, from a server application, an http response message, wherein the system is the server application, wherein the enhanced proxy is a server-side enhanced proxy representing the server application, and wherein the http message is the http response message.

3. The method of claim 1, further comprising:

receiving, from a client application, an http request message, wherein the system is the client application, wherein the enhanced proxy is a client-side enhanced proxy representing the client application, and wherein the http message is the http request message.

4. The method of claim 1, further comprising:

receiving the modified http message at a second enhanced proxy;

receiving, from a second enhanced LA at the second enhanced proxy, a second license information corresponding to a second system; and further modifying the modified http message, by modifying the header portion in the modified http message according to a third header type and a threshold numeric value corresponding to the third header type, the third header type and the threshold numeric value being identified in the second license information, and transmitting the further modified http message to the second system.

5. The method of claim 1, wherein the enhanced LA is a system that is independent of the proxy, non-proxy-specific, and on a first network that is different from a second network on which the proxy operates.

6. The method of claim 1, further comprising:

extracting from the http message a license identifier of the system, wherein the system includes the license identifier in the http message, and wherein the license identifier is usable by the enhanced LA to select a license associated with the system; and including the license identifier in a license verification request.

7. The method of claim 1, further comprising:

saving, at the enhanced proxy, the license information as a local copy of a license of the system;

receiving a second http message from the system;

omitting sending, from the enhanced proxy to the enhanced LA, a second license verification request corresponding to the second http message; and modifying, responsive to determining that a third header parameter of a header of a third header type in the http message is different from a third numeric value corresponding to the third header type, the second http message by modifying the third header parameter to the third numeric value and modifying the header portion in the second http message to include a fourth header type, the third header type, the third numeric value, and the fourth header type being identified in the local copy of the license.

8. The method of claim 7, wherein the modifying is responsive to the local copy of the license having an age less than a maximum age specified in the license information.

9. A computer usable program product comprising a computer-readable storage device, and program instructions stored on the storage device, the stored program instructions comprising:

program instructions to modify a proxy, to form an enhanced proxy, wherein the proxy is configured to inspect a header portion of a Hypertext Transfer Protocol (http) message, the modifying enabling the enhanced proxy to identify, at the enhanced proxy, a set of http header types in the http message received from a system;

program instructions to modify an external licensing authority (LA), to form an enhanced LA, wherein the enhanced LA is configured to verify a header parameter corresponding to a header type in the set of http header types and return a license information corresponding to the system, the license information specifying a first header type, a validity period specific to the first header type, a numeric value corresponding to the first header type, and a second header parameter corresponding to the first header type, the second header parameter required to be set in a header of the first header type when a first header parameter of the header of the first header type in the http message is set to the numeric value;

program instructions to modify, responsive to determining that, within the header portion of the http message, the first header type is present, the first header parameter is set to the numeric value and the second header parameter is not set, and the first header type is valid according to the validity period, the http message by adding the second header parameter to the header portion of the http message; and program instructions to transmit the modified http message.

10. The computer usable program product of claim 9, further comprising:

program instructions to receive, from a server application, an http response message, wherein the system is the server application, wherein the enhanced proxy is a server-side enhanced proxy representing the server application, and wherein the http message is the http response message.

11. The computer usable program product of claim 9, further comprising:

program instructions to receive, from a client application, an http request message, wherein the system is the client application, wherein the enhanced proxy is a client-side enhanced proxy representing the client application, and wherein the http message is the http request message.

12. The computer usable program product of claim 9, further comprising:

program instructions to receive the modified http message at a second enhanced proxy;

program instructions to receive, from a second enhanced LA at the second enhanced proxy, a second license information corresponding to a second system; and program instructions to further modify the modified http message, by modifying the header portion in the modified http message according to a third header type and a threshold numeric value corresponding to the third header type, the third header type and the threshold numeric value being identified in the second license information, and transmitting the further modified http message to the second system.

13. The computer usable program product of claim 9, wherein the enhanced LA is a system that is independent of the proxy, non-proxy-specific, and on a first network that is different from a second network on which the proxy operates.

14. The computer usable program product of claim 9, wherein the stored program instructions are stored in a computer readable storage device in a data processing system, and wherein the stored program instructions are transferred over a network from a remote data processing system.

15. The computer usable program product of claim 9, wherein the stored program instructions are stored in a computer readable storage device in a server data processing system, and wherein the stored program instructions are downloaded over a network to a remote data processing system for use in a computer readable storage device associated with the remote data processing system.

16. A computer system comprising a processor, a computer-readable memory, and a computer-readable storage device, and program instructions stored on the storage device for execution by the processor via the memory, the stored program instructions comprising:

program instructions to modify a proxy, to form an enhanced proxy, wherein the proxy is configured to inspect a header portion of a Hypertext Transfer Protocol (http) message, the modifying enabling the enhanced proxy to identify, at the enhanced proxy, a set of http header types in the http message received from a system;

program instructions to modify an external licensing authority (LA), to form an enhanced LA, wherein the enhanced LA is configured to verify a header parameter corresponding to a header type in the set of http header types and return a license information corresponding to the system, the license information specifying a first header type, a validity period specific to the first header type, a numeric value corresponding to the first header type, and a second header parameter corresponding to the first header type, the second header parameter required to be set in a header of the first header type when a first header parameter of the header of the first header type in the http message is set to the numeric value;

program instructions to modify, responsive to determining that, within the header portion of the http message, the first header type is present, the first header parameter is set to the numeric value and the second header parameter is not set, and the first header type is valid according to the validity period, the http message by adding the second header parameter to the header portion of the http message; and program instructions to transmit the modified http message.

* * * * *